(12) United States Patent
Saito et al.

(10) Patent No.: US 7,861,627 B2
(45) Date of Patent: Jan. 4, 2011

(54) MACHINE TOOL BED HAVING FLUID CHANNEL

(75) Inventors: Toshiyuki Saito, Toyoake (JP); Teruhiro Nakamura, Toyota (JP); Masahiro Ido, Kariya (JP); Naoki Makino, Kasugai (JP); Ikuya Kato, Nagoya (JP); Shinji Deguchi, Nagoya (JP)

(73) Assignee: JTEKT Corporation, Osaka-shi (JP)

( * ) Notice: Subject to any disclaimer, the term of this patent is extended or adjusted under 35 U.S.C. 154(b) by 128 days.

(21) Appl. No.: 11/500,970

(22) Filed: Aug. 9, 2006

(65) Prior Publication Data

US 2007/0062348 A1    Mar. 22, 2007

(30) Foreign Application Priority Data

Aug. 23, 2005   (JP) .............................. 2005-241181

(51) Int. Cl.
*B23B 17/00* (2006.01)
(52) U.S. Cl. .................... 82/149; 409/235; 408/234; 248/637
(58) Field of Classification Search ......... 409/235–238; 82/149, 158; 224/321; 29/DIG. 50; 408/234; 248/637; *B23B 17/00*
See application file for complete search history.

(56) References Cited

U.S. PATENT DOCUMENTS

| 1,096,588 | A | * | 5/1914 | Hazelton | 409/219 |
|---|---|---|---|---|---|
| 1,426,496 | A | * | 8/1922 | Norris | 269/296 |
| 2,482,729 | A | * | 9/1949 | Dzus | 409/206 |
| 3,195,415 | A | * | 7/1965 | Shorb | 409/219 |
| 3,793,777 | A | * | 2/1974 | Lang | 451/395 |
| 5,611,137 | A | * | 3/1997 | Braun | 29/560 |
| 5,833,103 | A | * | 11/1998 | Rak | 224/321 |
| 5,871,130 | A | * | 2/1999 | Cucheran et al. | 224/321 |
| 6,439,813 | B1 | * | 8/2002 | Repossini | 409/235 |
| 6,641,341 | B2 | * | 11/2003 | Sato et al. | 409/137 |
| 7,044,693 | B2 | * | 5/2006 | Fujiwara | 409/137 |
| 7,104,169 | B2 | * | 9/2006 | Inada et al. | 82/149 |
| 7,165,919 | B2 | * | 1/2007 | Schweizer et al. | 409/137 |
| 7,241,090 | B2 | * | 7/2007 | Reynders | 409/135 |
| 2003/0049087 | A1 | * | 3/2003 | Gronbach et al. | 409/235 |
| 2004/0115019 | A1 | * | 6/2004 | Gronbach | 409/235 |
| 2004/0255736 | A1 | | 12/2004 | Nakamura et al. | |

FOREIGN PATENT DOCUMENTS

| DE | 43 26 595 A1 | 2/1995 |
|---|---|---|
| EP | 0 358 852 A1 | 3/1990 |
| JP | 61-214929 | 9/1986 |

OTHER PUBLICATIONS

Attachment I, Drawing showing reinforcement attached at opposite topmost portion of the bed channel.*

* cited by examiner

*Primary Examiner*—Boyer D Ashley
*Assistant Examiner*—Sara Addisu
(74) *Attorney, Agent, or Firm*—Oblon, Spivak, McClelland, Maier & Neustadt, L.L.P.

(57) ABSTRACT

A bed for machine tool includes a fluid channel crossing the bed and at least one reinforcement bridging the fluid channel. Thus the machining accuracy of a workpiece becomes higher.

5 Claims, 5 Drawing Sheets

MACHINE TOOL BED HAVING FLUID CHANNEL

INCORPORATION BY REFERENCE

The present application claims priority under 35 U.S.C. §119 to Japanese Patent Application No. 2005-241181, filed on Aug. 23, 2005. The contents of that application are incorporated herein by reference in their entirety.

BACKGROUND OF THE INVENTION

1. Field of the Invention

This invention relates to a bed for a machine tool, wherein the bed has a fluid channel.

2. Discussion of the background

Metal working by a machine tool conventionally requires fluid, for example a coolant in order to cool down a contact point between a workpiece and the machining tool, oil in order to lubricate or cool down the machining tool, etc. The fluid is collected and resupplied by a circulatory conduit.

A conventional machine tool 1 is shown in a perspective view in FIG. 1, in a side view FIG. 2(A) and in a front view in FIG. 2(B). The upper surface of a bed 10 of the machine tool 1 has a recess that forms a fluid channel 16 where fluid flows. For example, the fluid is a coolant for cooling down a contact point between the machining tool (not shown) mounted on a tool spindle stock 20 and a workpiece (not shown) supported by a head stock 14 and a tail stock 15. The fluid is supplied to the contact point between the machining tool and the workpiece, drops into the fluid channel 16, is collected to a tank (not shown) and is resupplied to the contact point.

It is preferable that the rigidity of the bed 10 is high. The reason is that deformation of the bed results from low rigidity so as to cause an error of the relative position between the workpiece and the machining tool, even if the machining tool on the tool spindle stock 20 is accurately controlled.

However the presence of the fluid channel 16 lowers the rigidity of the bed 10. That causes rotational vibration of the head stock 14, the tail stock 15, the table 15a, etc. around the X-axis, as shown in FIG. 2(A). Thus there may occur fluctuation of the relative position between the workpiece and the machining tool so that the machining accuracy may be lower. Additionally, as shown in FIG. 2(B), because of recent requirements of downsizing, some machine tools 1 have the head stock 14, etc. overhanging the side 10L of the bed 10. In such machine tool 1, the rotational vibration of the head stock 14, etc. around Z-axis may be increased because of the low rigidity of the bed 10, so that the machining accuracy may be lower.

SUMMARY OF THE INVENTION

In view of the foregoing, it is an object of the present invention to provide a bed for a machine tool whose rigidity becomes higher.

In order to further the above and other objects, a bed for a machine tool whose natural frequency becomes higher comprises a fluid channel crossing the bed and at least one reinforcement bridging the fluid channel.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of a bed for a machine tool related to the present invention will be described with reference to the figures.

Figure 1:
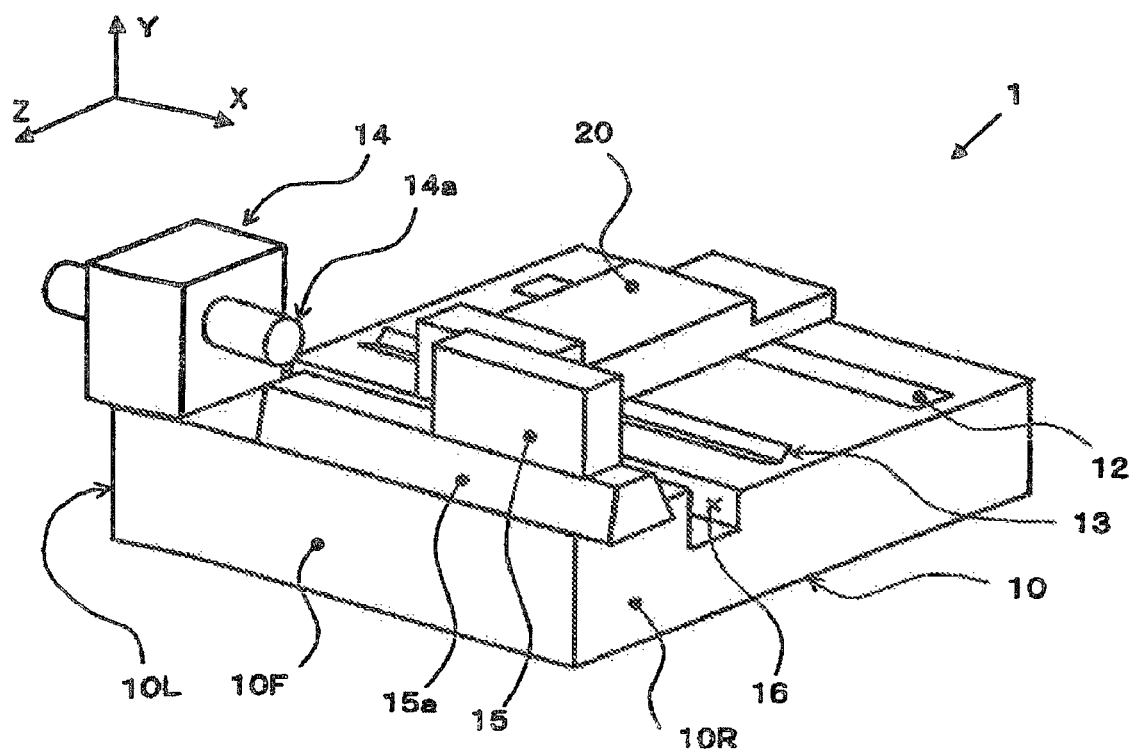
FIG. 1 is a perspective view of a bed for a machine tool of a conventional machine tool.
Figure 2:
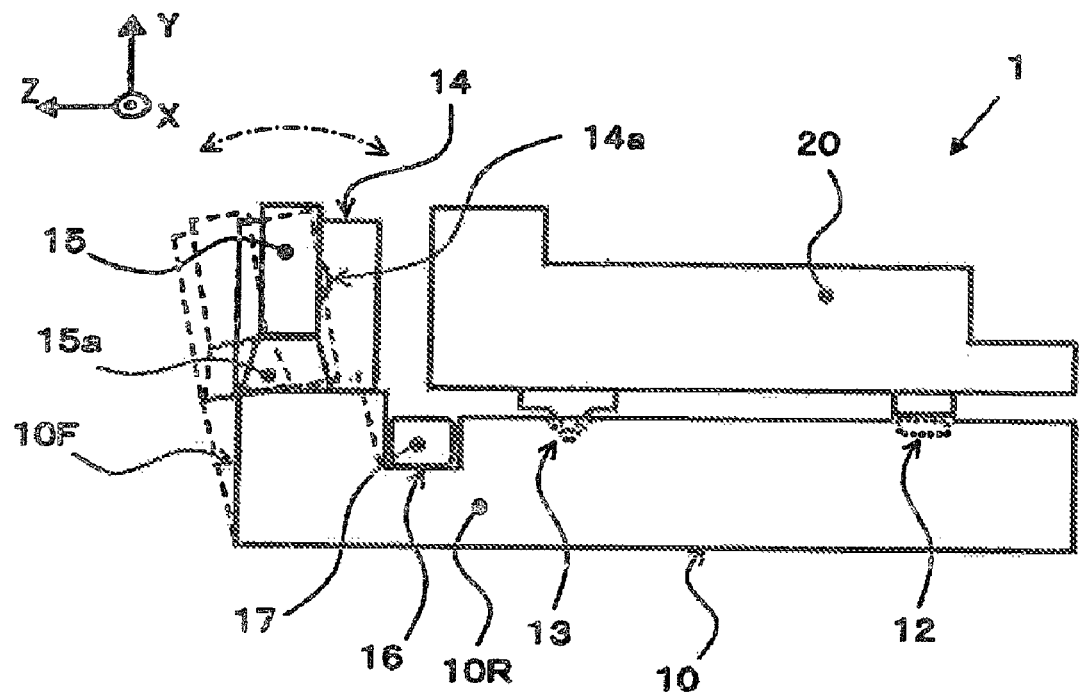
FIG. 2(A) is a side view of the conventional machine tool.
FIG. 2(B) is a front view of the conventional machine tool.
Figure 2:
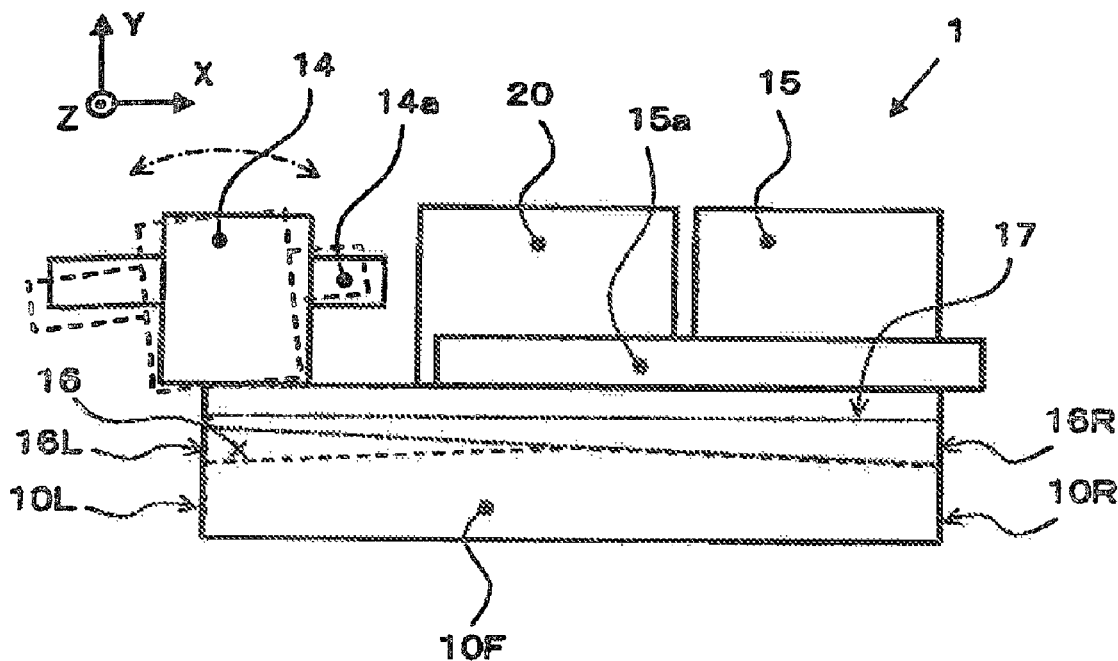

A conventional machine tool 1 is shown in FIG. 1 in a perspective view, FIG. 2(A) in a side view and FIG. 2(B) in a front view. A machine tool 1 comprises a bed 10, a head stock 14, a spindle 14a, a tail stock 15, a table 15a, a tool spindle stock 20, a plain guide 12, a V-shape guide 13, etc. The X, Y and Z-axes are right-angled to each other. The Y-axis is vertical. The X-axis is horizontal and corresponds to a rotational axis of a workpiece (not shown) supported between the spindle 14a and the tail stock 15. The Z-axis is horizontal and corresponds to a moving direction of a machining tool (not shown) perpendicular to the X-axis. The plain guide 12 and the V-shape guide 13 are fixed onto the bed 10 and guide the tool spindle stock 20 moving along the X-axis. The machining tool (not shown) is movably arranged on the tool spindle stock 20 along the Z-axis. Fluid (coolant, oil, etc.) is supplied to a contact point between the machining tool and the workpiece. The bed 10 has a fluid channel 16 crossing its top surface from one side 10R to the other side 10L in order to flow the fluid. The fluid channel 16 has openings 16R and 16L at the both sides 10L and 10R so that the fluid is led and collected to a tank (not shown) through the openings 16L and 16R. Then the fluid is resupplied to the contact point between the machining tool and the workpiece.

As shown in FIG. 2(B), the fluid channel 16 is formed by a combination of two slopes. A seam of the slopes is the highest point at the center of the fluid channel 16, and the each slope leans to each opening 16L and 16R of the lowest point respectively. On the right slope of the fluid channel 16 of FIG. 2(B) is an elongated fluid collecting pan 17 whose bottom leans to the right opening 16R. Thus the fluid is supplied to the contact point, drops onto the pan 17, flows toward the right opening 16R and is collected to the tank from the opening 16R. (Of course, the fluid collecting pan 17 may be at the left slope. In this case, the fluid is collected from the left opening 16L.) The fluid channel 16 is able to form another shape, for example the center need not be the highest point, or the opening of the lowest point could be present at only one side. Namely, the fluid channel 16 could have at least one opening 16L or 16R.

In the conventional machine tool 1, because of the presence of the fluid channel 16, the rigidity of the bed 10 is reduced so that the head stock 14, the spindle 14a, the tail stock 15 and the table 15a may vibrate toward and apart from the tool spindle stock 20, as shown in FIG. 2(A), so as to deteriorate the machining accuracy of the workpiece. Also as shown in FIG. 2(B), where one part, for example the head stock 14, etc., overhangs from the side 10L of the bed 10, the reduced rigidity may let the part vibrate in the direction of the overhanging so as to deteriorate the machining accuracy of the workpiece.

Hereinafter there will be described embodiments of a bed 10 for a machine tool 1 related to the present invention which reduces the rotational vibration of FIGS. 2(A) and 2(B). However, because the basic structure of the machine tool of the embodiments is similar to the conventional art of FIG. 1, the explanation of equipment arranged on the bed will be omitted.

Figure 3:
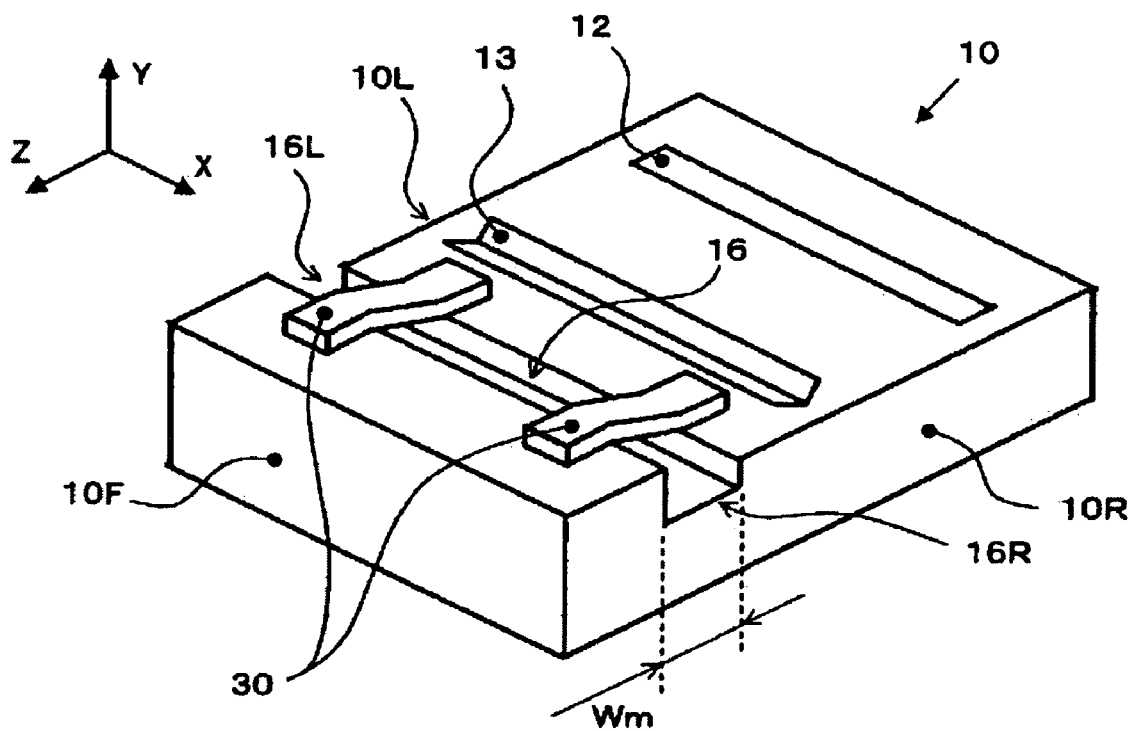
FIG. 3(A) is a perspective view of a bed for a machine tool of a first embodiment of the present invention.
FIG. 3(B) is a perspective view of a bed for a machine tool of a second embodiment of the present invention.
Figure 3:
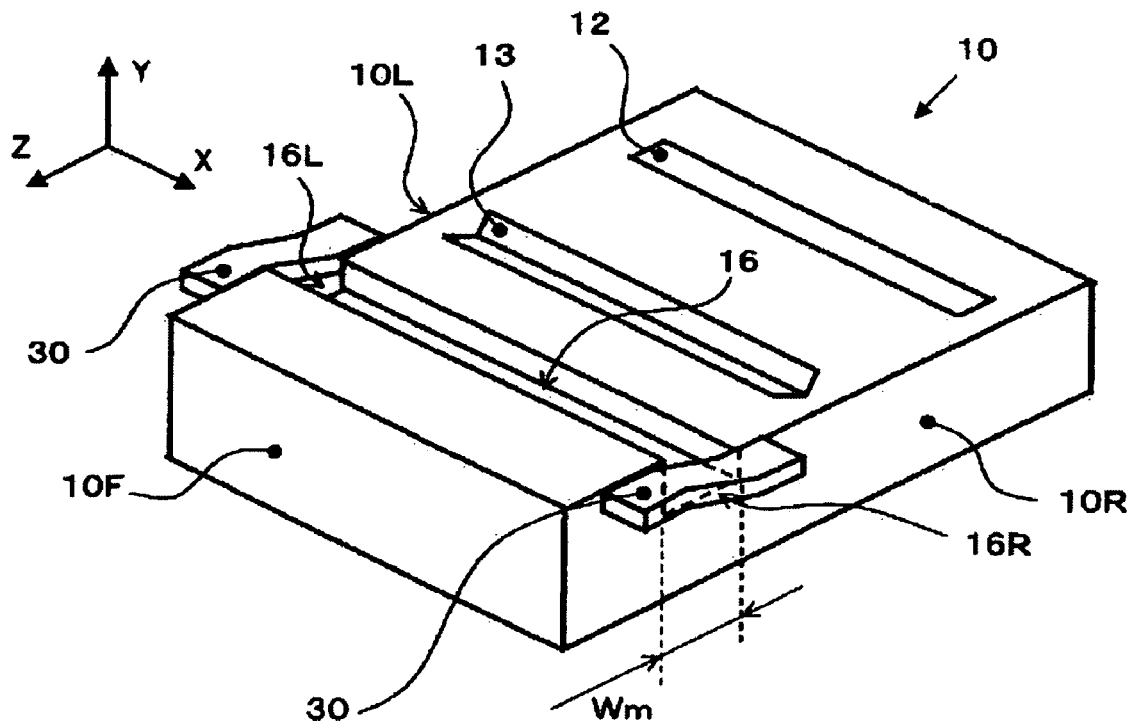

A bed structure of first embodiment will be described with reference to FIG. 3(A). In the first embodiment, a pair of reinforcements 30 bridges the fluid channel 16 over its width Wm. In this embodiment the reinforcements are each comprised of a rigid element having ends fixed to the top of the bed at opposite sides of the fluid channel. The number of the reinforcements 30 is at least one, so one or a plurality of the reinforcement 30 bridges the fluid channel 16. Each reinforcement 30 is arranged not to interfere with the tool spindle stock 20 guided on the plain guide 12 and the V-shape guide 13 to move along the X-axis. The reinforcements 30 make the rigidity of the bed 10 higher so as to reduce the rotational vibration of the head stock 14, the tail stock 15 and the table 15a around X-axis shown in FIG. 2(A). Thus the machining accuracy of the workpiece becomes higher.

A bed structure of a second embodiment will be described with reference to FIG. 3(B). In the second embodiment, a pair of reinforcements 30 bridges the fluid channel 16 over its width Wm at both sides 10L and 10R of the bed 10 where the openings 16L and 16R exist. In this embodiment the reinforcements are each comprised of a rigid element having ends fixed to the sides of the bed at opposite upper sides of the fluid channel. The number of the reinforcements 30 is at least one, so at least one of both sides 10L and 10R of the fluid channel 16 is bridged by the reinforcement 30. The reinforcements 30 may be designed favorably without restriction of their size, shape, etc, so long as they do not interfere with the tool spindle stock. The reinforcements 30 make the rigidity of the bed 10 higher so as to reduce the rotational vibration of the head stock 14, the tail stock 15 and the table 15a around the X-axis shown in FIG. 2(A). Thus the machining accuracy of the workpiece becomes higher.

Figure 4:
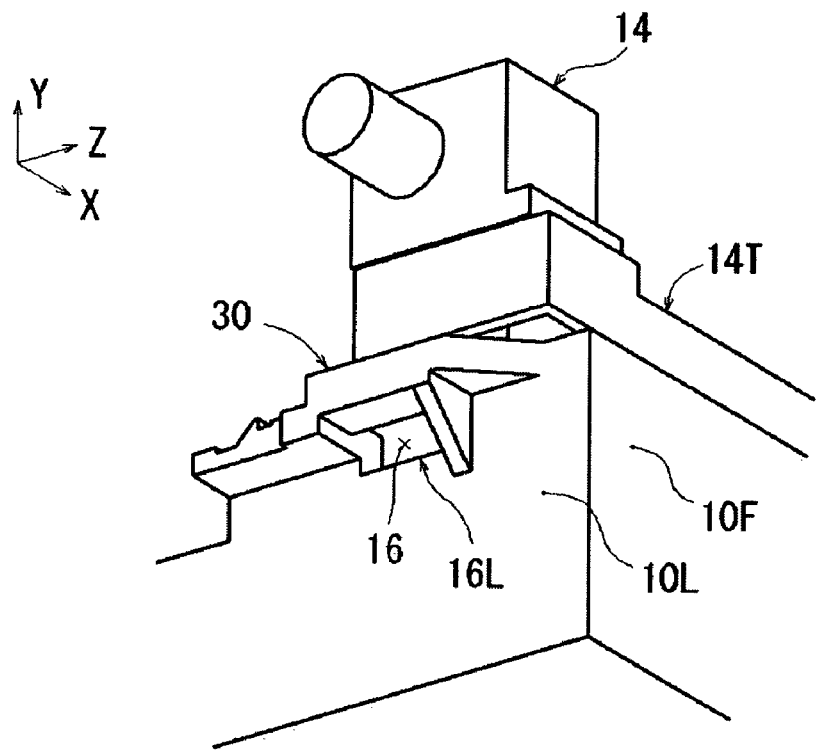
FIGS. 4(A) and 4(B) show explanatory drawings of a reinforcement of a third embodiment of the present invention.
Figure 4:
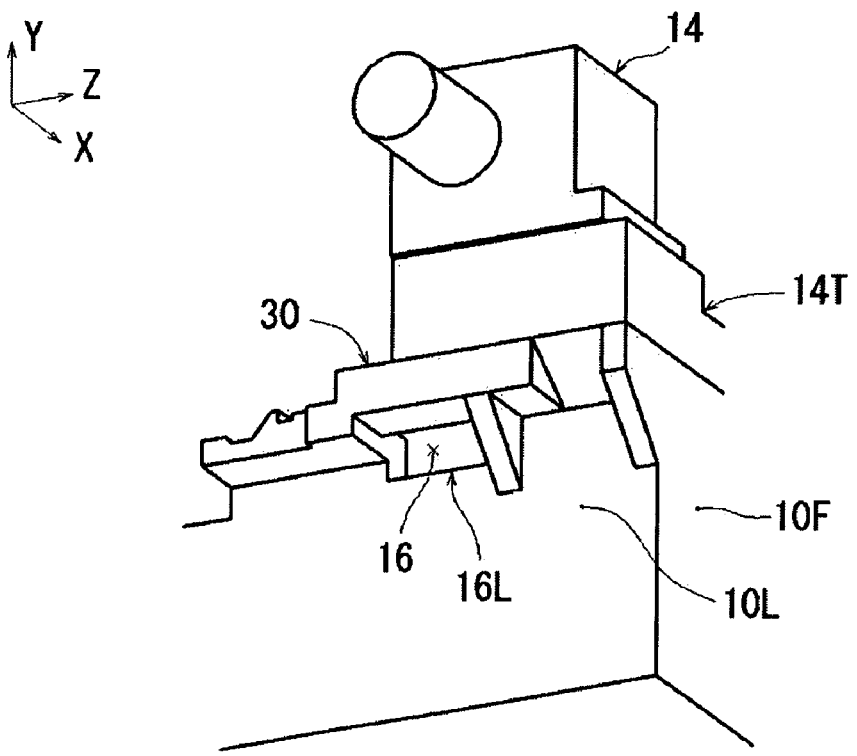

A bed structure of third embodiment will be described with reference to FIGS. 4(A) and 4(B). A head stock 14 and a head stock table 14T are mounted on the bed 10 adjacent to the opening 16L. A reinforcement 30 bridges the opening 16L of the fluid channel 16 and also supports the head stock 14 and the head stock table 14T which overhang the side 10L of the bed 10. In this embodiment the reinforcements are each comprised of a rigid element having ends fixed to the sides of the bed at opposite upper sides of the fluid channel. The reinforcement 30 and the bed 10 are connected by ribs so that the reinforcement 30 and the ribs favorably support the weight of the head stock 14 and the head stock table 14T overhanging from the bed 10. The reinforcement 30 makes the rigidity of the bed 10 higher so as to reduce the rotational vibration of the head stock 14 around the Z-axis shown in FIG. 2(B). Thus the machining accuracy of the workpiece becomes higher.

Figure 5:
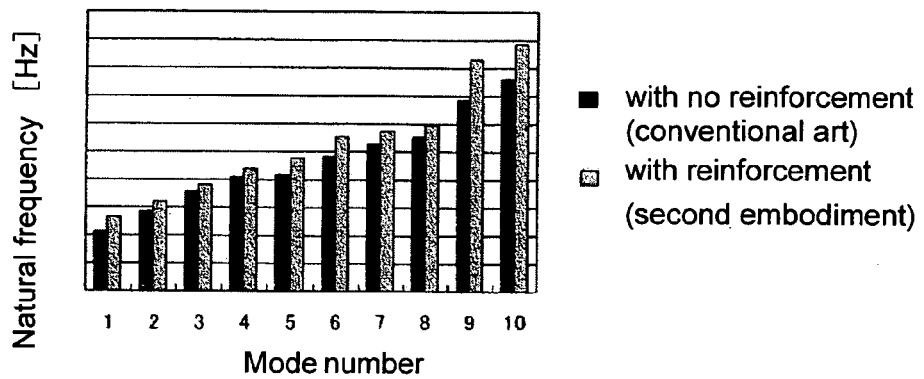
FIGS. 5(A) and 5(B) show explanatory drawings of effects of the embodiments.
Figure 5:
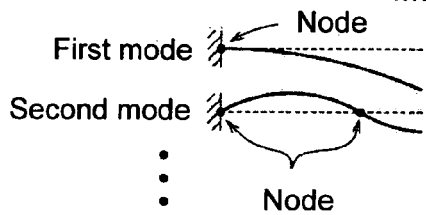
Figure 5:
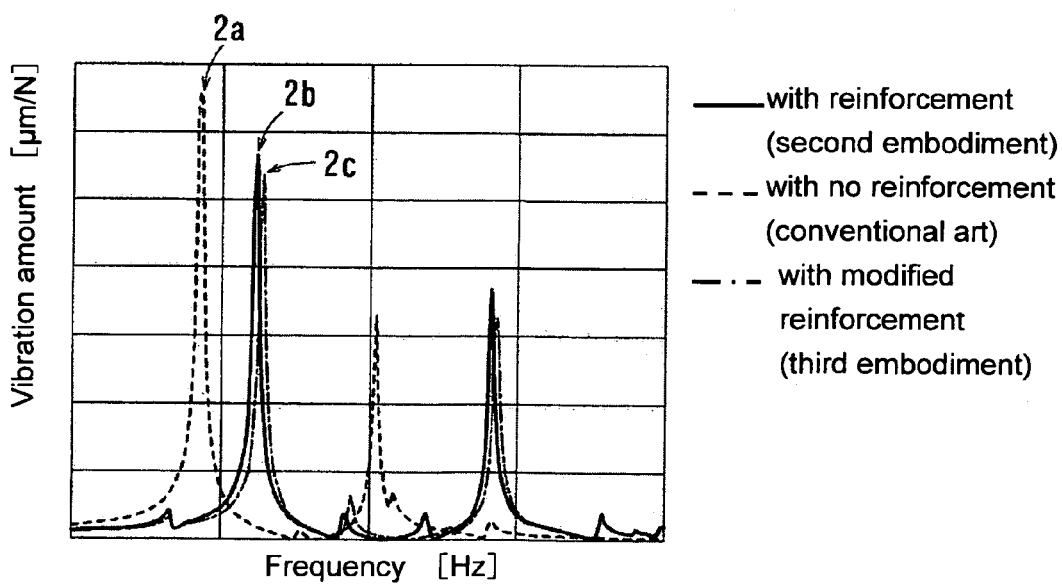

Next, effects of the embodiments of the present invention will be described with reference to FIGS. 5(A) and 5(B), compared to the conventional art. FIG. 5(A) shows a simulation graph whose horizontal axis is a mode number and vertical axis is natural frequency, comparing the conventional art having no reinforcement with the embodiment having the reinforcement (the second embodiment) at every mode number. FIG. 5(A) also shows an explanatory drawing of the mode number at the bottom. The mode number is the number of nodes of a cantilever, wherein the first mode indicates a vibration with one node and the second mode indicates a vibration with two nodes.

As shown in the graph of FIG. 5(A), the bed 10 of the embodiment has a higher natural frequency than the conventional art. Where the natural frequency of the machine tool exists in a range of a frequency of vibrations caused by using the machining tool (for example, rotating a grinding wheel of a grinding machine), the bed 10 resonates because of the natural frequency so as to deteriorate the machining accuracy. However, because the bed 10 of the embodiment makes the natural frequency of the machine tool 1 higher, the natural frequency is higher than the range of the vibration frequency of the machining tool. Therefore the vibration frequency of the machining tool does not correspond to the natural frequency of the machine tool 1 so as to improve the machining accuracy.

Changing the range of using the machining tool (e.g. the rotation range of the grinding wheel) should affect the machining accuracy because the machining tool directly contacts the workpiece. So changing the natural frequency of the machine tool 1 is preferable for higher machining accuracy. In addition, a higher natural frequency is preferable to a lower natural frequency. The reason is that the vibration frequency of the machining tool goes through the low frequency level during the transition from stop to the operating range of the machining tool.

FIG. 5(B) shows a simulation graph whose horizontal axis is frequency [Hz] and vertical axis is vibration amount [μm/N]. In FIG. 5(B), a dotted line identifies the bed of the conventional art having no reinforcement, a solid line identifies the second embodiment having the reinforcement and a chain line identifies the third embodiment having the modified reinforcement. As shown in the graph of FIG. 5(B), in comparison with the conventional art (the dotted line's peak 2a), the natural frequencies of the second embodiment (the solid line's peak 2b) and the third embodiment (the chain line's peak 2c) shift to higher frequencies and reduce their vibration amount. The peaks 2a, 2b and 2c identify the natural frequencies corresponding to the second mode of the mode number explained in FIG. 5(A).

Obviously, numerous modifications and variations of the present invention are possible in light of the above teachings. For example, the type of the machine tool 1 and the shape, the size, the bridging position, the number and the material of the reinforcement(s) 30 may be changed from the above mentioned embodiments. It is thereby to be understood that within the scope of the appended claims, the present invention may be practiced otherwise than as specifically described herein.

What is claimed is:

1. A bed structure for a machine tool comprising:
   a bed having a topmost surface and two side surfaces;
   at least one of a head stock, a tail stock and a machining tool mounted to said bed;
   a fluid channel in the bed, the fluid channel forming a recess extending into the bed from the topmost surface of the bed, and crossing the topmost surface of the bed from one of the side surfaces to the other of the side surfaces to flow fluid; and
   at least one rigid reinforcement bridging the fluid channel, wherein the reinforcement is immovably fixed to the bed at opposite sides of the channel,
   wherein the rigid reinforcement is fixed to the topmost surface of the bed at opposite sides of the channel.

2. The bed structure according to claim 1, comprising said head stock, said tail stock and said machining tool mounted to said bed.

3. The bed structure according to claim 1, comprising said head stock, said tail stock and said machining tool having a tool spindle stock mounted to said bed, wherein said head stock and said tail stock are mounted to the bed on one side of the channel and the machining tool is mounted to the bed at the other side of the channel.

4. The bed structure according to claim 3, further comprising cooperating guides at the bed and machining tool for guiding movement of the machining tool on the bed.

5. The bed structure according to claim 3, further comprising cooperating guides at the bed and machining tool for guiding movement of the machining tool on the bed in a direction substantially parallel to the length of the channel.

* * * * *